United States Patent Office 3,642,830
Patented Feb. 15, 1972

3,642,830
DINITROFLUOROALKYL EPOXIDES
Milton B. Frankel, Tarzana, Michael G. Warner, Camarillo, and Edward F. Witucki, Sepulveda, Calif., assignors to North American Rockwell Corporation
No Drawing. Continuation-in-part of application Ser. No. 634,023, Apr. 13, 1967. This application Aug. 26, 1968, Ser. No. 755,468
Int. Cl. C07d 1/00
U.S. Cl. 260—348                                4 Claims

ABSTRACT OF THE DISCLOSURE

Dinitrofluoroalkyl epoxides having the general formula:

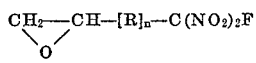

wherein R is a lower alkylene radical containing from 1 through 5 carbon atoms and $n$ is 0 or 1.

CROSS-REFERENCE TO RELATED APPLICATION

This application is a continuation-in-part of applicants' copending application, U.S. Ser. No. 634,023, filed Apr. 13, 1967, now abandoned.

BACKGROUND OF THE INVENTION

There exists a need for energetic binders that are thermally stable and that are not highly impact sensitive. This need is most urgently felt in the area of tactical ordnance. These binders are most suitably provided in the form of polymers, for ease of manufacture. There exists a corresponding need for monomers capable of producing such energetic polymers suitable for the uses described.

It is an object of this invention to provide a new class of chemical compounds.

It is still a further object of this invention to provide a new class of monomers suitable for polymerization into polymers useful as energetic binders.

SUMMARY OF THE INVENTION

The novel compounds of the instant invention are dinitrofluoroalkyl epoxides having the general formula:

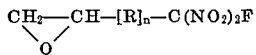

wherein R is an alkylene radical of from 1 through 5 carbon atoms and $n$ is 0 or 1.

The compounds of this invention are prepared by the epoxidation of dinitrofluoromethyl olefins with peroxytrifluoroacetic acid, in accordance with the general reaction scheme set forth below:

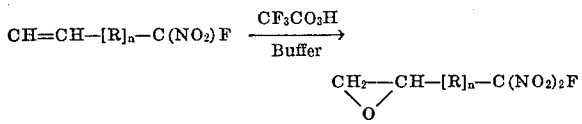

wherein R and $n$ are as defined above. The reaction should be buffered to a pH of between 6 and 11.

For reasons of safety, it is preferred that the reaction be carried out in solution. This preferred synthesis is carried out by preparing a methylene chloride solution of peroxytrifluoroacetic acid, generated in situ from 90 percent hydrogen peroxide and trifluoroacetic anhydride. This solution is then added to a boiling mixture of the olefin in methylene chloride with disodium hydrogen phosphate as the buffer. Methylene chloride is convenient for the reflux action due to its low boiling point. Naturally, other chlorinated solvents such as chloroform, trichlorethylene, and chlorobenzene would be suitable. Moreover, other solvents not reactive with the reactants can be used. The use of peroxytrifluoroacetic acid in a buffered medium for the epoxidation of negatively substituted olefins has been described. (W. D. Emmons and A. S. Pagano, Journal of the American Chemical Society, 77, 89, 1955.)

DESCRIPTION OF THE PREFERRED EMBODIMENTS

To more clearly illustrate this invention, the following example is presented.

Example I.—Preparation of 1,1-dinitro-1-fluoro-butene

To a well-stirred mixture of 377 g. (2.44 moles) of silver nitrite in 500 ml. of dry methylene chloride was added dropwise 288.3 (2.13 moles) of 1-bromo-3-butene while maintaining the temperature at approximately 15° (this reaction was carried out in the dark to its completion). After the addition was complete (30 min.), the reaction mixture was allowed to warm to room temperature and stirring was continued until the supernatant liquid showed a negative test for bromide. This required approximately 4 days. The gray solid was removed by filtration and washed well with methylene chloride. The solvent was removed under vacuum and the orange liquid residue was fractionated through a small Vigreux column to yield 25 g. of low boiling material, $n_D^{25}$ 1.4275, presumably the 1-nitroso-3-butene, and 126.3 g. (62 percent yield) of 1-nitro-3-butene, B.P. 55°/19 mm., $n_D^{25}$ 1.4308.

*Analysis.*—Calculated for $C_4H_7NO_2$ (percent): C, 47.50; H, 6.95. Found (percent): C, 47.63; H, 6.71.

To 25.2 g. (0.63 mole of sodium hydroxide dissolved in 225 ml. of water was added 62.1 g. (0.615 mole) of 1-nitro-3-butene dropwise while maintaining the temperature at 3° C. After the addition was complete, 42.5 g. (0.615 mole) of sodium nitrite was added and the reaction mixture was stirred for approximately 30 minutes while warming to room temperature.

This freshly prepared solution was then added quickly with good stirring to a solution of 209 g. (1.23 moles) of silver nitrate, 450 ml. of water, and 450 ml. of ether at 3° C. (Just prior to this addition a few drops of sodium hydroxide were added to the silver nitrate solution until the appearance of silver oxide was noted.) A heavy cream-colored solid was formed immediately and the temperature rose to 15° C. The solid decomposed rapidly with blackening. The cooling bath was then removed and the mixture was stirred for 1 hour. The silver was filtered and washed well with ether. The ether layer was separated and the aqueous layer was extracted several times with ether. The combined ether portions were dried over magnesium sulfate and the excess solvent removed at reduced pressure. The resulting orange liquid residue was fractionated through a small Vigreux column yielding 38 g. (43 percent yield) of 1,1-dinitro-3-butene, B.P. 63.5–65°/1.5 mm., $n_D^{25}$ 1.4504.

Into a 250 ml. round bottom flask equipped with a Dry Ice condenser, thermometer, and gas inlet, was placed 2 g. of sodium hydroxide in 15 ml. of water, 7.3 g. (0.05 mole) of 1,1-dinitro-3-butene and 35 ml. of methanol. This mixture was stirred at room temperature for 1 hour. After purging the system with nitrogen, perchloryl fluoride was admitted slowly above the liquid until refluxing began; this required approximately 40 minutes. The rate of perchloryl fluoride admission was then set so that the reaction temperature remained approximately at 20° C. (cooling was regulated by the reflux rate). After a reaction time of approximately 2 hours, 50 ml. of water was added; the hazy solution became clear. The solution was extracted 3 times with 50 ml.

portions of methylene chloride and the combined methylene chloride extracts were then washed 3 times with 50 ml. portions of water. After drying the methylene chloride solution over magnesium sulfate, solvent was removed under reduced pressure and the residual yellow liquid was fractionated through a small Vigreux column to yield 4.1 g. (50 percent yield) of 1,1-dinitro-1-fluoro-3-butene, B.P. 47°/9 mm., $n_D^{25}$ 1.4210. The infrared spectrum was consistent with the desired structure.

*Analysis.*—Calculated for $C_4H_5FN_2O_4$ (percent): C, 29.30; H, 3.05; N, 17.06. Found (percent): C, 29.04; H, 3.17; N, 17.22.

Example II.—Preparation of 1,1-dinitro-1-fluoro-3,4-epoxybutane

A solution of peroxytrifluoroacetic acid was prepared from 1.05 ml. (0.0375 mole) of 90 percent hydrogen peroxide, 6.35 ml. (0.045 mole) of trifluoroacetic anhydride, and 7.5 ml. of methylene chloride. This reagent was added over a 35 minute period to a well stirred, boiling mixture of 4.92 g. (0.03 mole) of 1,1-dinitro-1-fluoro-3-butene, 30 ml. of methylene chloride, and 17 g. (0.12 mole) of disodium hydrogen phosphate (predried in a vacuum oven overnight at 50° C.). After this mild exothermic reaction had subsided, the solution was heated under reflux for 1½ hours. The resulting mixture was stirred with 75 ml. of water until all the inorganic salts had dissolved. The organic layer was separated and the aqueous layer was extracted with 2–10 ml. portions of methylene chloride. The combined methylene chloride extracts were washed with 15 ml. of 10 percent sodium bicarbonate solution and dried over magnesium sulfate. The solvent was removed at reduced pressure and the residual liquid was fractionated through a small Holzman column to yield 0.64 grams of unreacted 1,1-dinitro-1-fluoro-3-butene and 3.35 g. (72 percent yield) of 1,1-dinitro-1-fluoro-3,4-epoxybutane B.P. 75° (2.85 mm.) $n_D^{25}$ 1.4365. The infrared spectrum was consistent with the assigned structure.

*Analysis.*—Calculated for $C_4H_5N_2O_5F$ (percent): C, 26.67; H, 2.80; N, 15.55; epoxy oxygen, 8.88. Found (percent): C, 26.64; H, 2.63; N, 15.65; epoxy oxygen, 8.86.

A wide variety of compounds can be prepared in accordance with the example set forth above. 1,1-dinitro-1-fluoro-2,3-epoxypropane is prepared by the epoxidation of 1,1 - dinitro - 1-fluoro-2-propene, 1,1-dinitro-1-fluoro-4,5-epoxypentane is prepared from 1,1-dinitro-1-fluoro-4-pentene, 1,1-dinitro-1-fluoro-5,6-epoxyhexane is prepared from 1,1-dinitro-1-fluoro-5-hexene, 1,1-dinitro-1-fluoro-6,7-epoxyheptane is prepared from 1,1-dinitro-1-fluoro-6-heptene, and 1,1-dinitro-1-fluoro-7,8-epoxyoctane is prepared by the epoxidation of 1,1-dinitro-1-fluoro-7-octene.

A castable explosive composition of matter was formulated by intimately mixing 20 weight percent of 1,1-dinitro-1-fluoro-3,4-fluoroethoxide with 80 weight percent of cyclotetramethylenetetramine, 1,3,5,7 - tetranitro-1,3,5,7-tetrazocyclo-octane, and the exposive power for said composition was measured by comparing it against TNT and a composition consisting essentially of 20 weight percent of carboxy-terminated polybutadiene, commercially available under the registered trademark Butarez, intimately mixed with 80 weight percent of cyclotetramethylenetetramine, 1,3,5,7-tetracyclo-octane. The performance for the novel castable explosive composition was 1.670, performance for 100 percent TNT was 1.000, and the performance for the butadiene-cyclotetramethyleneamine was 1.017. These results indicate the unobvious and unexpected energetic property for the novel compounds of the invention.

It is apparent from the above discussion that any member of the above series of dinitrofluoroalkyl epoxides can be prepared by the epoxidation of the dinitrofluoromethyl olefin, according to the teachings of this invention.

These dinitrofluoroalkyl epoxides can readily be converted to dihydroxy-terminated liquid prepolymers of varying molecular weight by catalytic reaction, using a catalyst such as $BF_3$ and an initiator containing OH groups, such as water, a glycol, or glycerine. The reaction can be summarized:

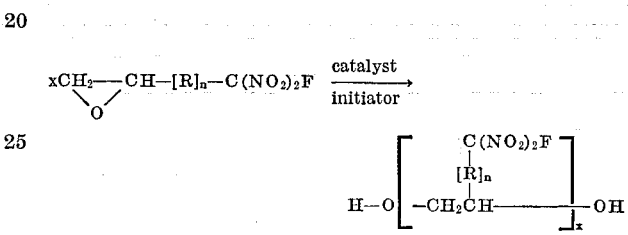

where $x$ is preferably about 10. These liquid prepolymers can be loaded with high percentages of oxidizers and fuel, cast, and cured in a tough resilient composite propellant or explosive composition, which are very energetic.

It is to be understood that the example presented is merely a means of illustration and is not intended to limited to limit the scope of the invention in any, the scope of which is defined by the following claims.

We claim:

1. As compositions of matter, dinitrofluoroalkyl epoxides having the formula:

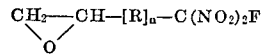

wherein R is a lower alkylene radical of from 1 to 5, and $n$ is 0 or 1.

2. The compound of claim 1 where $n$ is 0.

3. The compound of claim 1 where R is methylene and $n$ is 1.

4. The compound of claim 1 where R is propylene and $n$ is 1.

References Cited

UNITED STATES PATENTS 3,316,292   4/1967   Schaeffler _____ 260—486
3,366,697   1/1968   Kamlet _____ 260—644

LELAND A. SEBASTIAN, Primary Examiner

U.S. Cl. X.R.

149—88, 92